US008886854B2

(12) United States Patent
Fukuoka

(10) Patent No.: US 8,886,854 B2
(45) Date of Patent: Nov. 11, 2014

(54) DATA TRANSFER DEVICE AND STORAGE DEVICE

(75) Inventor: Yuzi Fukuoka, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 13/336,133

(22) Filed: Dec. 23, 2011

(65) Prior Publication Data

US 2012/0210024 A1  Aug. 16, 2012

(30) Foreign Application Priority Data

Feb. 10, 2011 (JP) ................. 2011-027157

(51) Int. Cl.
| | |
|---|---|
| *G06F 3/00* | (2006.01) |
| *G06F 5/00* | (2006.01) |
| *G06F 11/30* | (2006.01) |
| *G06F 13/00* | (2006.01) |
| *G06F 3/06* | (2006.01) |
| *H04L 1/00* | (2006.01) |

(52) U.S. Cl.
CPC ............ *G06F 11/3089* (2013.01); *G06F 13/00* (2013.01); *G06F 3/0619* (2013.01); *G06F 11/3041* (2013.01); *H04L 1/0061* (2013.01); *H04L 2001/0094* (2013.01)
USPC ............................................. 710/22; 710/33

(58) Field of Classification Search
CPC ................................ G06F 3/0169; G06F 13/00
USPC ....................................................... 710/22, 33
See application file for complete search history.

(56) References Cited

U.S. PATENT DOCUMENTS

| | | | | |
|---|---|---|---|---|
| 6,477,143 | B1 * | 11/2002 | Ginossar ........................ | 370/230 |
| 6,931,524 | B2 | 8/2005 | Ehmann et al. | |
| 8,074,032 | B2 * | 12/2011 | Higaki et al. .................. | 711/114 |
| 2008/0126698 | A1 | 5/2008 | Honda | |

FOREIGN PATENT DOCUMENTS

| | | |
|---|---|---|
| JP | 4-124759 A | 4/1992 |
| JP | 6-335042 A | 12/1994 |
| JP | 09-251439 A | 9/1997 |
| JP | 9-265428 A | 10/1997 |
| JP | 10-290270 A | 10/1998 |
| JP | 2004-80283 A | 3/2004 |
| JP | 2004-355430 A | 12/2004 |
| JP | 2005-501337 A | 1/2005 |
| JP | 2006-18689 A | 1/2006 |
| JP | 2008-071005 A | 3/2008 |
| JP | 2009-26051 A | 2/2009 |
| WO | WO 03/019379 | 3/2003 |

OTHER PUBLICATIONS

Japanese Office Action issued Jul. 8, 2014 for corresponding Japanese Patent Application No. 2011-027157, with Partial English Translation, 4 pages.

* cited by examiner

*Primary Examiner* — Zachary K Huson
(74) *Attorney, Agent, or Firm* — Fujitsu Patent Center

(57) ABSTRACT

A data transfer device includes a transmitter, a receiver, and a monitor. The transmitter transmits data by non-handshake communication, and the receiver receives the data transmitted from the transmitter. Further, the monitor is provided separately from the receiver, and monitors a size of data received by the receiver to notify the transmitter of a result of monitoring.

6 Claims, 14 Drawing Sheets

FIG. 10

| RECEPTION START ADDRESS | RECEIVING-SIDE REQUESTER ID (Bus/Dev/Func) | MONITORING RANGE | TRANSMITTING-SIDE CONTROLLER MODULE NUMBER | TRANSMITTING-SIDE REQUESTER ID (Bus/Dev/Func) | TRANSMITTING-END START ADDRESS |
|---|---|---|---|---|---|
| 0x5000_0000 | 3/5/0 | 0x20_0000 | #5 | 5/0/0 | 0x50_8000_0000 |
| 0x3000_0000 | 3/5/0 | 0x20_0000 | #3 | 3/0/0 | 0x30_8000_0000 |
| ... | ... | ... | ... | ... | ... |

# DATA TRANSFER DEVICE AND STORAGE DEVICE

CROSS-REFERENCE TO RELATED APPLICATION

This application is based upon and claims the benefit of priority of the prior Japanese Patent Application No. 2011-027157, filed on Feb. 10, 2011, the entire contents of which are incorporated herein by reference.

FIELD

The embodiments discussed herein are related to a data transfer device and a storage device.

BACKGROUND

Conventionally, internal transfer of data has been performed in a storage device or the like. In recent years, with the demand for improvement in the data transfer amount or data transfer speed, there has been widely used a technique of transferring data at high speed by non-handshake communication. In such non-handshake communication, delivery of data is not assured, so that a technique of assuring delivery of data is desired.

As a technique related to the above-mentioned delivery assurance, to verify writing of data into a memory by DMA (direct memory access), there has been proposed a technique of counting the number of data items using a bus monitor (e.g. see Japanese Laid-Open Patent Publication No. 2004-355430).

Further, for a serial data transfer system, there has also been proposed a technique of checking a data error by adding a CRC code to data (e.g. see Japanese Laid-Open Patent Publication No. 10-290270).

Further, for a delivery type data transfer system, there has been proposed a technique in which a target device monitors data transfer to another target device via a bus, and captures the transferred data in the target device itself as well (e.g. see Japanese Laid-Open Patent Publication No. 09-251439).

Furthermore, as a technique of monitoring a bus signal, there has been proposed a technique in which a CPU circuit is used which is capable of monitoring various types of events generated on a communication channel is used, and if an event of a specific type is generated, the CPU circuit is reconfigured (e.g. see Japanese PCT Application Translation Publication No. 2005-501337).

However, in the internal transfer of data, data to be transferred is often transferred after being divided into a plurality of data items, and hence any of the conventional techniques disclosed as above does not enable confirmation of delivery of all data items without fail, with high assurance and with simple configuration.

SUMMARY

According to an aspect of the invention, there is provided a data transfer device including a transmitter configured to transmit data by non-handshake communication, a receiver configured to receive data transmitted from the transmitter, and a monitor configured to monitor a size of data received by the receiver, and notify the transmitter of a result of monitoring, the monitor being provided separately from the receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of a conversion table prepared in the checking device;

DESCRIPTION OF EMBODIMENTS

Figure 1:
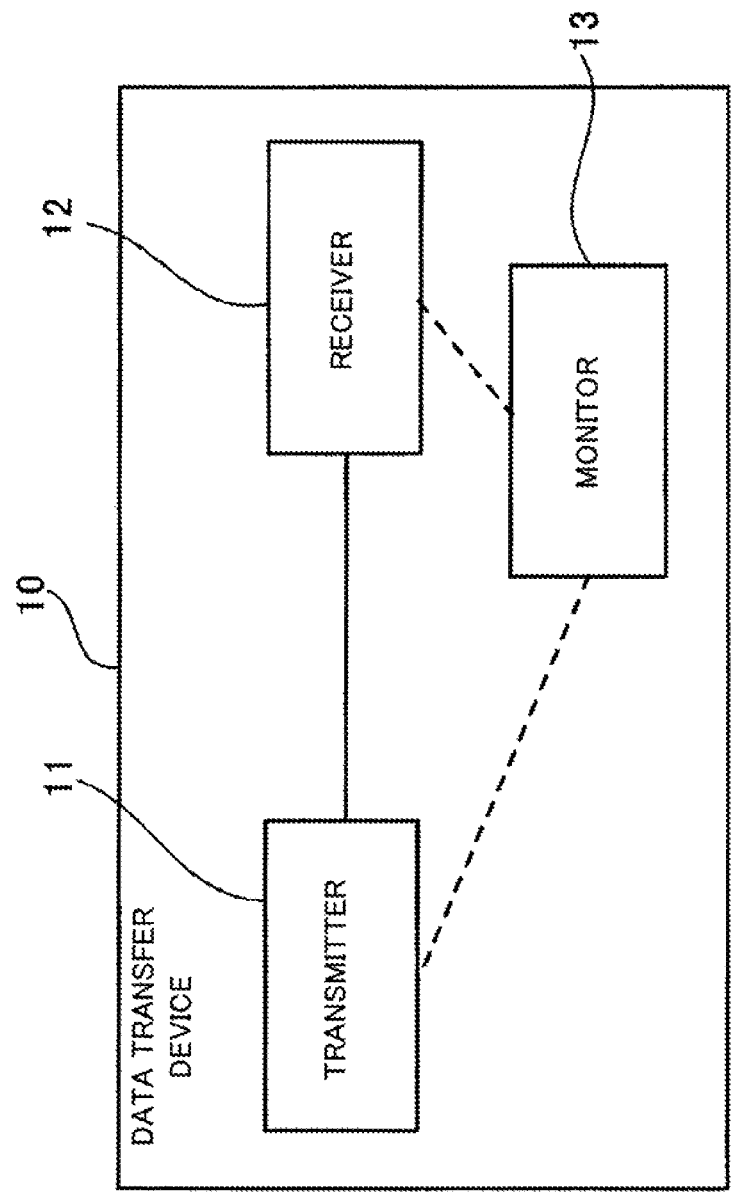
FIG. 1 illustrates a first embodiment of a data transfer device.

Embodiments of the present invention will be explained below with reference to the accompanying drawings, wherein like reference numerals refer to like elements throughout.

FIG. 1 illustrates a first embodiment of a data transfer device.

A data transfer device 10 illustrated in FIG. 1 includes a transmitter 11, a receiver 12, and a monitor 13.

The transmitter 11 transmits data by non-handshake communication.

The receiver 12 receives data transmitted from the transmitter 11.

The monitor 13 monitors a size of data received by the receiver 12, and notifies the transmitter 11 of a result of monitoring. The monitor 13 is provided separately from the receiver 12.

According to the data transfer device 10 configured as above, it is possible for the transmitter 11 side to know the data size through monitoring by the monitor 13. If it can be confirmed that delivered data has the same size as that of transmitted data, successful data delivery can be confirmed with a high assurance. Further, the monitor 13 having this function can be realized by a simple unit which is small enough in size, and the data transfer device 10 incorporating the monitor 13 configured as above also has a simple construction.

Figure 2:
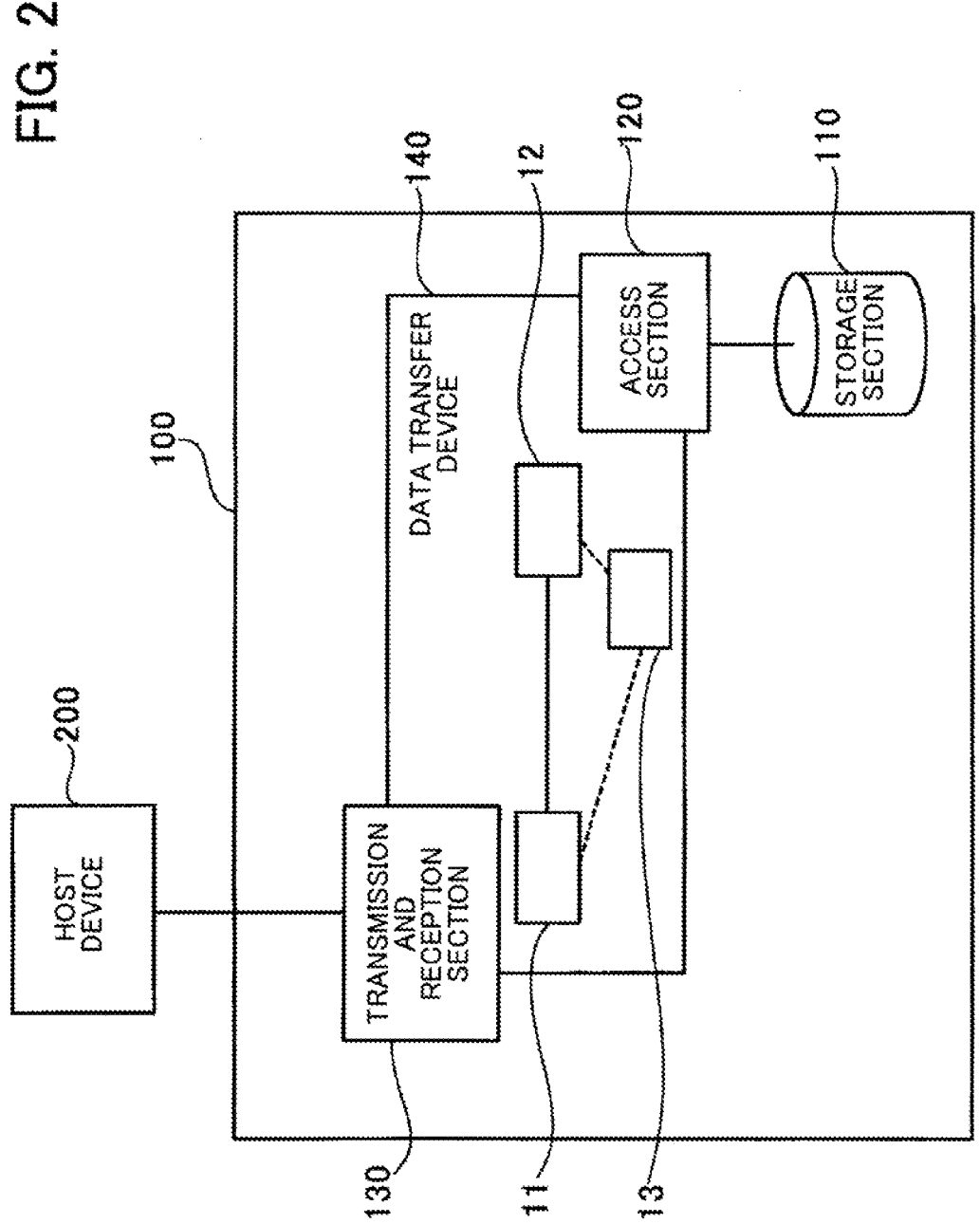
FIG. 2 illustrates a first embodiment of a storage device.

FIG. 2 illustrates a first embodiment of a storage device.

The storage device, which is denoted by 100 in FIG. 2, includes a storage section 110, an access section 120, a transmission and reception section 130, and a data transfer device 140.

The storage section 110 stores data.

The access section 120 accesses the storage section 110 to thereby perform at least one of reading of reproduced data and writing of recorded data.

The transmission and reception section 130 performs transmitting and receiving of at least one of reproduced data and recorded data to and from a host device 200.

The data transfer device 140 is responsible for internal data transfer within a range from the transmission and reception section 130 to the access section 120. The data transfer device 140 includes the transmitter 11, the receiver 12, and the monitor 13, similarly to the data transfer device 10 illustrated in FIG. 1.

The storage device 100 configured as above is also capable of realizing the confirmation of data delivery concerning internal data transfer performed by the data transfer device 140, with a high assurance and simple configuration.

As a result, it can be said that the storage device 100 as viewed from the host device 200 is a device having a high reliability of operation.

Figure 3:
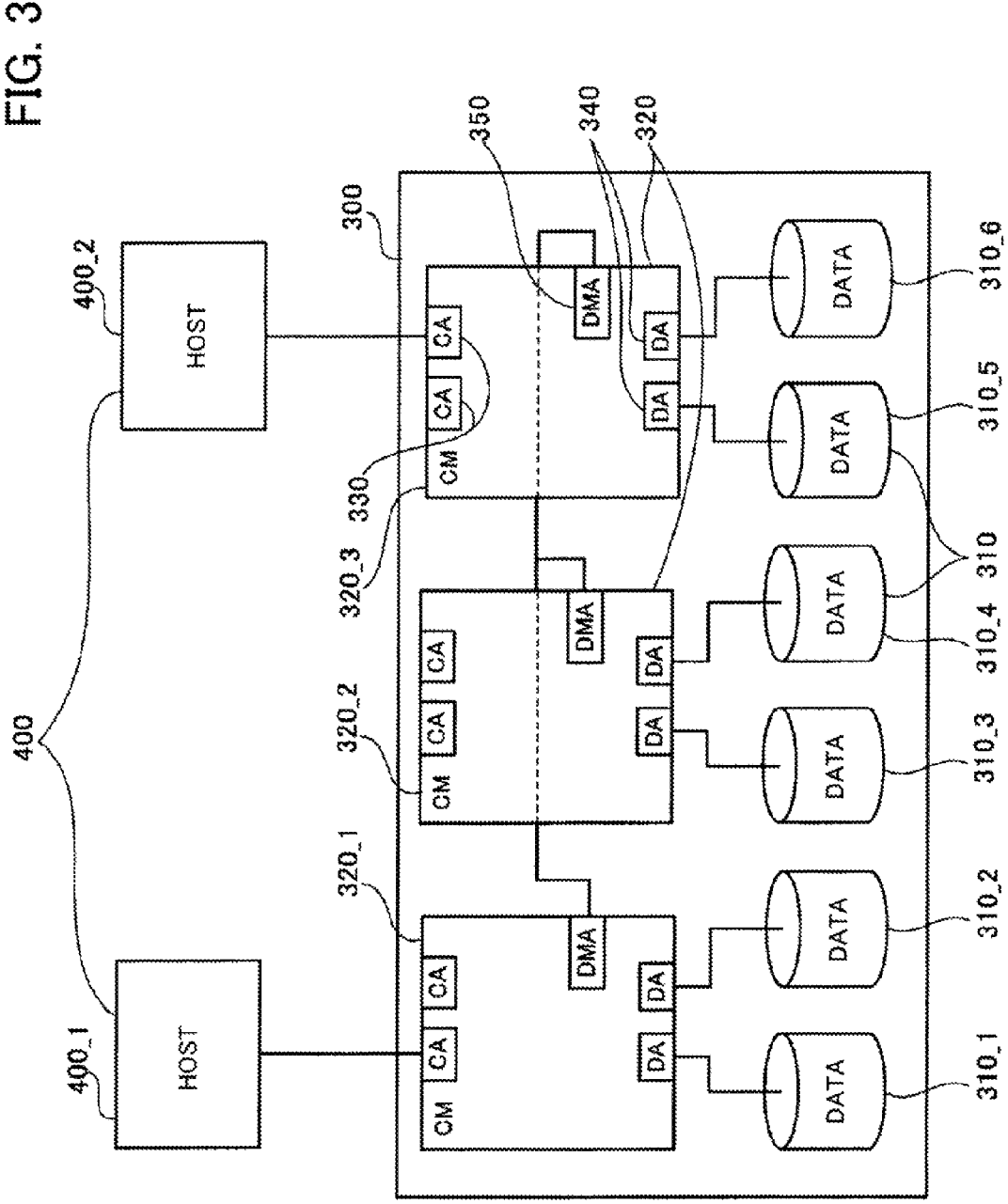
FIG. 3 illustrates a second embodiment of the storage device.

FIG. 3 illustrates a second embodiment of the storage device. The storage device according to the second embodiment incorporates a second embodiment of the data transfer device.

A storage device 300 illustrated in FIG. 3 incorporates a plurality of disk units 310. More specifically, FIG. 3 illustrates six disk units $310\_1, \ldots ,$ and $310\_6$, by way of example. In the following description, when the six disk units $310\_1, \ldots ,$ and $310\_6$ are generically referred to without distinction, they are referred to as the disk units 310. The disk units 310 are each used for storing data. That is, the disk units 310 each correspond to an example of the storage section. There are various types of disk units, such as an HDD (hard disk drive), an SSD (solid state disk), and so forth. As the disk units 310 of the present embodiment, there may be used any type of disk units.

The storage device 300 further includes a plurality of controller modules (CM) 320. More specifically, FIG. 3 illustrates three controller modules $320\_1, 320\_2,$ and $320\_3$. In the following description, when the three controller modules $320\_1, 320\_2,$ and $320\_3$ are generically referred to without distinction, they are referred to as the controller modules 320.

The controller modules 320 each include channel adapters (CA) 330, device adapters (DA) 340, and a direct memory access (DMA) device 350. Further, as will be described hereinafter, the controller modules 320 each include a CPU, a memory, and so forth, and hence the controller modules 320 can execute various kinds of processing operations according to the contents of programs operating on the CPU.

Each channel adapter 330 is connected to a host 400 as a host device. Each controller module 320 receives a write command and data to be written into an associated one of the disk units 310 according to the write command from the host 400 via an associated one of the channel adapters 330. Further, each controller module 320 receives a read command from the host 400 via the associated channel adapter 330, and sends the data to the host 400 via the associated channel adapter 330, which is read from the associated one of the disk units 310 according to the read command. Note that although FIG. 3 illustrates the two hosts $400\_1$ and $400\_2$, by way of example, in the following description, when the two hosts $400\_1$ and $400\_2$ are generically referred to without distinction, they are referred to as the hosts 400.

Each device adapter 340 is connected to an associated one of the disk units 310. The controller modules 320 access the disk units 310 via the respective device adapters 340 to thereby exchange data with the disk units 310.

The DMA device 350 is used for interconnecting the controller modules 320. That is, the controller modules 320 transfer data to each other via the respective DMA devices 350, as required. As a communication method in this transfer operation, a non-handshake communication method based on PCI Express is used.

A case where data transfer is needed is e.g. a case where a command is issued from the left one $400\_1$ of the two hosts $400\_1$ and $400\_2$ illustrated in FIG. 3, for writing data into the right-end one $310\_6$ of the six disk units $310\_1, \ldots ,$ and $310\_6$ illustrated in FIG. 3. In this case, data to be written is received by the left-end one $320\_1$ of the three controller modules $320\_1, 320\_2,$ and $320\_3$ illustrated in FIG. 3, but it is the right-end one $320\_3$ that actually sends the data to the right-end disk unit $310\_6$. Therefore, the data is sent from the left-end controller module $320\_1$ to the right-end controller module $320\_3$ via the DMA devices 350. A combination of the plurality of (three in this example) controller modules $320\_1, 320\_2,$ and $320\_3$ interconnected as above corresponds to the second embodiment of the data transfer device.

Note that a one-to-one connection relationship between a controller module 320 and a host 400 and a one-to-two connection relationship between a controller module 320 and disk units 310 are merely an example, and the connection relationships can be modified according to the settings of the controller modules 320 insofar as the channel adapter 330 and the device adapter 340 can physically support them.

Figure 4:
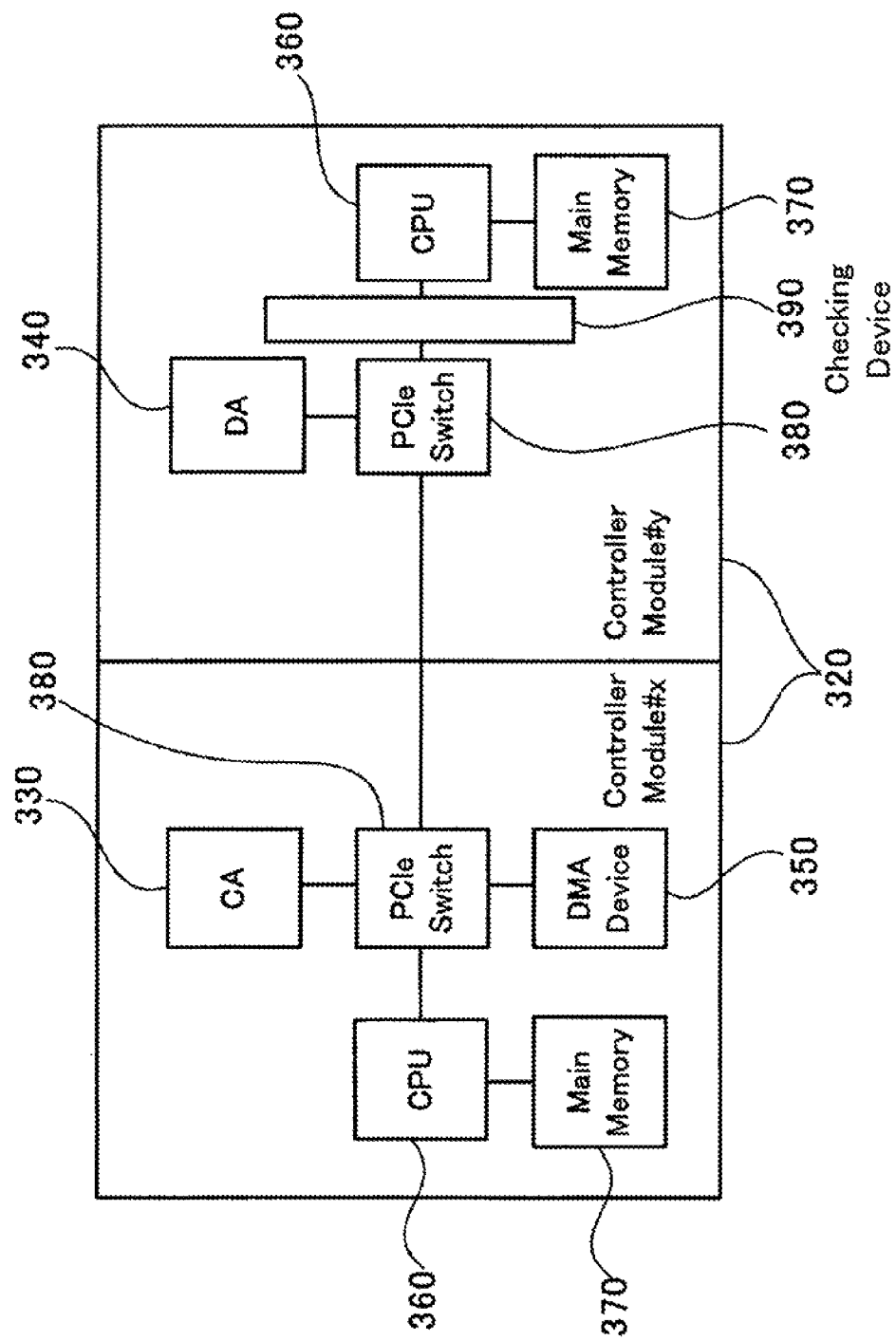
FIG. 4 schematically illustrates controller modules interconnected via DMA devices.

FIG. 4 schematically illustrates the controller modules interconnected via the DMA devices.

FIG. 4 schematically illustrates the two controller modules 320. Although the channel adapter 330 and the DMA device 350 are illustrated in one of the two controller modules 320, and the device adapter 340 is illustrated in the other of the controller modules 320, this is for the sake of convenience. Actually, as illustrated in FIG. 3, all of the controller modules 320 each include the channel adapters 330, the device adapters 340, and the DMA device 350. Note that when it is necessary to distinguish these two controller modules 320 in the following description, as denoted in FIG. 4, the left controller module 320 is referred to as the controller module x, and the right controller module 320 is referred to as the controller module y.

As described hereinabove, the controller modules 320 each include a CPU 360 and a main memory 370. The CPU 360 operates according to a program loaded into the main memory 370, whereby each controller module 320 performs various functions.

The controller modules 320 further each include a PCI Express switch 380 and a checking device 390. Although the checking device 390 is also illustrated in only one of the controller modules 320 in FIG. 4 for the sake of convenience, actually, the controller modules 320 each include the checking device 390.

The switch 380 is used for switching a destination of data transmission by PCI Express according to an address attached to the data. Further, the switch 380 also has a function of sending data by multicast transmission to a plurality of addresses. The two controller modules 320 are physically interconnected via the switches 380, but are interconnected via the DMA devices 350 from a viewpoint of the data transfer function.

The checking device 390 is responsible for checking of transfer data in the data transfer between the controller modules 320. That is, the checking device 390 corresponds to an example of the above-described monitor. The checking device 390 is implemented e.g. by a FPGA. The specific checking operation performed by the checking device 390 will be described in detail hereinafter.

Figure 5:
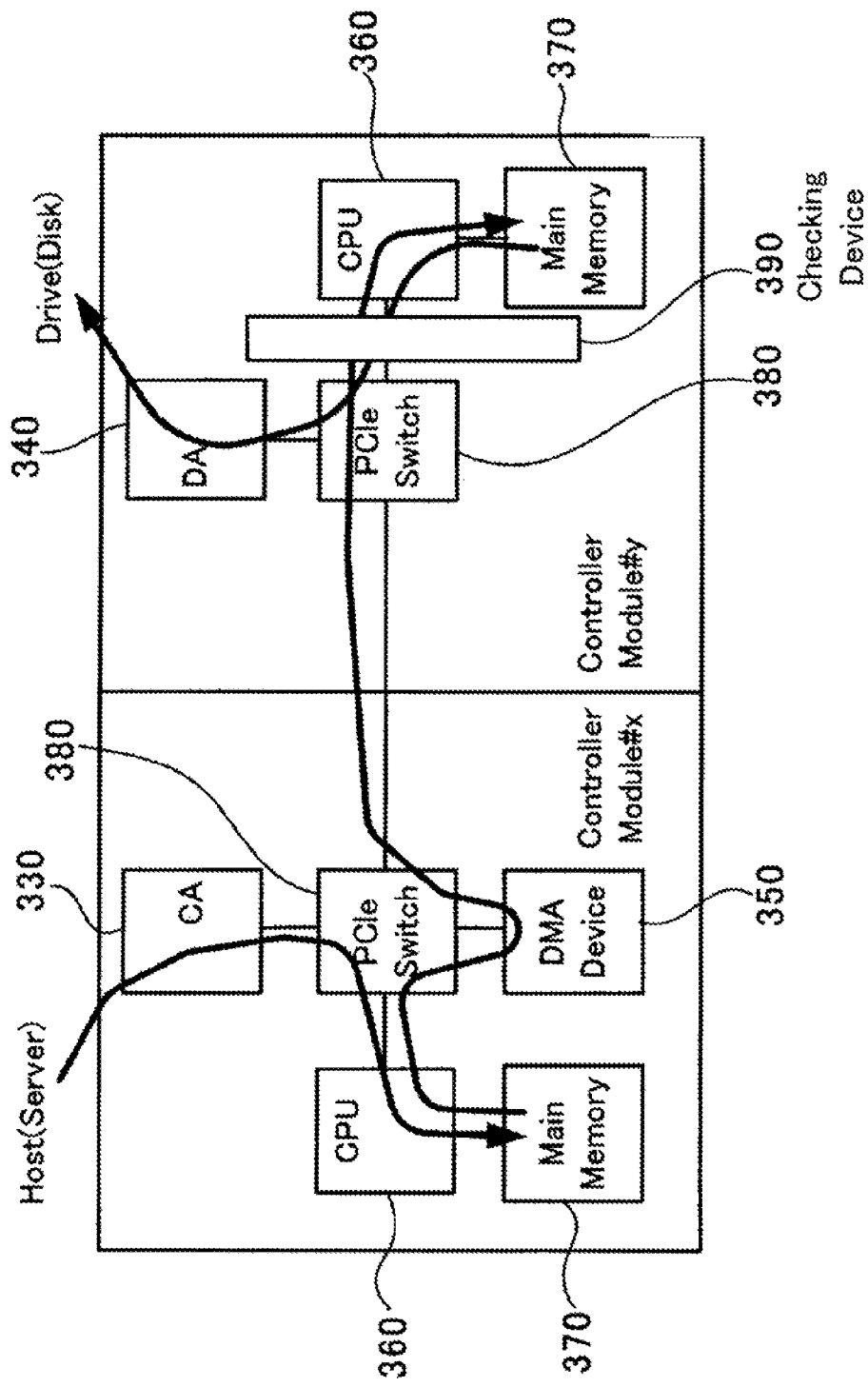
FIG. 5 illustrates an example of data transfer between the two controller modules illustrated in FIG. 4.

FIG. 5 illustrates an example of data transfer between the two controller modules illustrated in FIG. 4.

FIG. 5 illustrates an example in which the controller module x of the two controller modules 320 receives data from the host, and transfers the received data to the controller module y, and the controller module y writes the transferred data into a disk.

The controller module x receives the data from the host via the channel adapter 330. The received data is sent to the CPU 360 via the switch 380, and is stored in the main memory 370 by the CPU 360. It is assumed that the data received from the host includes a designation of a location where the data is to be stored.

In the example illustrated in FIG. 5, the designated storage location is not a desk unit connected to the controller module x, but a disk unit connected to the controller module y. Therefore, the CPU 360 judges that it is necessary to transfer the data to the controller module y. Then, the CPU 360 retrieves the data from the main memory 370, and sends the same to the DMA device 350 via the switch 380. Further, the CPU 360 instructs the DMA device 350 to transfer the data to the controller module y. As a result, the DMA device 350 designates an address of the main memory 370 of the controller module y as a destination, and then transfers the data. The address of the destination is referred to as the "start address" which means an address for starting data storage. As described in detail hereinafter, although even when the start address indicates the same destination, an address space is different on a controller module-by-controller module basis, the address of the destination is referred to as the "start address" without distinction. Further, to the transfer data, "transmitting device information" which is information indicative of a device of a transmitting end is also attached.

In the data transfer, the DMA device 350 appropriately divides the data into a plurality of data blocks. Further, for the convenience of checking by the checking device 390 and subsequent processing, the DMA device 350 performs data transfer in a state in which a "Relaxed Ordering Attribute" bit is turned off so as to prevent an order of transmission of the plurality of data blocks from being changed. This "Relaxed Ordering Attribute" bit is used for instructing the switch 380 and the like whether or not to allow the order of transmission of the data blocks to be changed. When the "Relaxed Ordering Attribute" bit is on, the transmission order is allowed to be changed, whereas when it is off, the transmission order is not allowed to be changed.

The data is transmitted through the respective switches 380, the checking devices 390, and further via the respective CPUs 360 of the controller module x and the controller module y, and then stored in the main memory 370 of the controller module y.

Note that although the data physically passes through the CPUs 360, the computing function of the CPUs 360 is not used, but a memory controller part incorporated in each CPU 360 is used.

The data transferred to the main memory 370 of the controller module y is checked by the CPU 360 of the controller module y on a designated storage location. As a result, the data is sent to and written into the disk unit via the switch 380 and the device adapter 340 according to the instruction from the CPU 360.

In the data transfer described as above, the DMA device 350 of the controller module x corresponds to an example of the transmitter, and the main memory 370 of the controller module y corresponds to an example of the receiver. Further, as mentioned above, the checking device 390 corresponds to an example of the monitor, so that in the present embodiment, the monitor is provided on a communication path extending from the transmitter to the receiver. When the monitor exists on the communication path as described above, it is possible to make the monitoring operation performed by the monitor easier than the monitoring operation performed at a location other than the communication path, and it is possible to simplify the construction and function of the monitor itself. Hereinafter, the monitoring operation performed by the checking device 390 will be described in detail.

Figure 6:
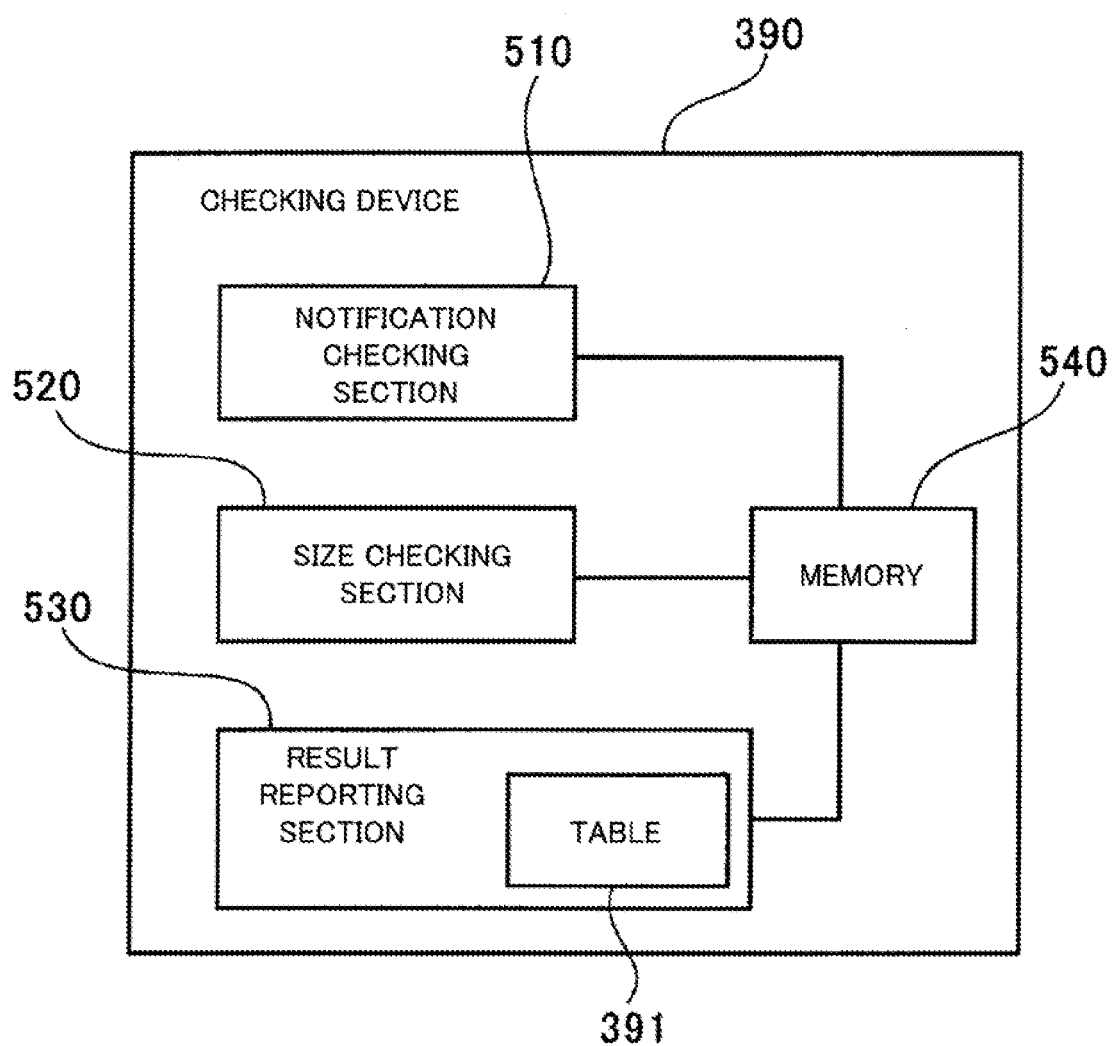
FIG. 6 illustrates a construction of a checking device.
Figure 7:
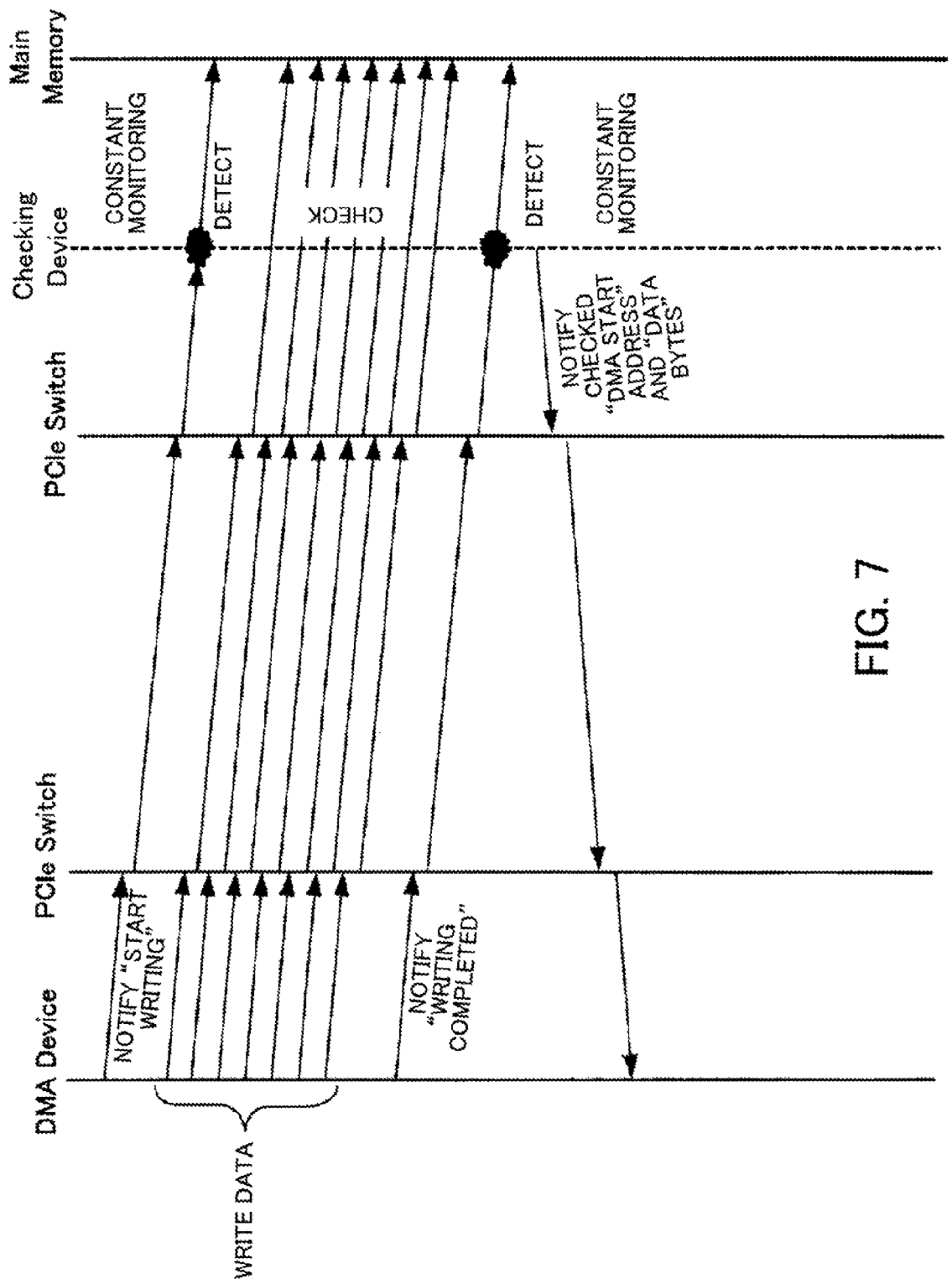
FIG. 7 illustrates a sequence of a monitoring operation performed by the checking device.

FIG. 6 illustrates a construction of the checking device. FIG. 7 illustrates a sequence of the monitoring operation performed by the checking device.

Hereinafter, in the following description given with reference to FIGS. 6 and 7, FIG. 5 is also referred to.

When data is transferred from the DMA device 350 of the controller module x to the main memory 370 of the controller module y as described above, the DMA device 350 sends a notification of the start of data transfer to the checking device 390 as a first step of the data transfer. In the present embodiment, this notification of the start is incorporated in part of the data transferred by DMA, and is transferred from the DMA device 350 to the main memory 370.

Figure 8:
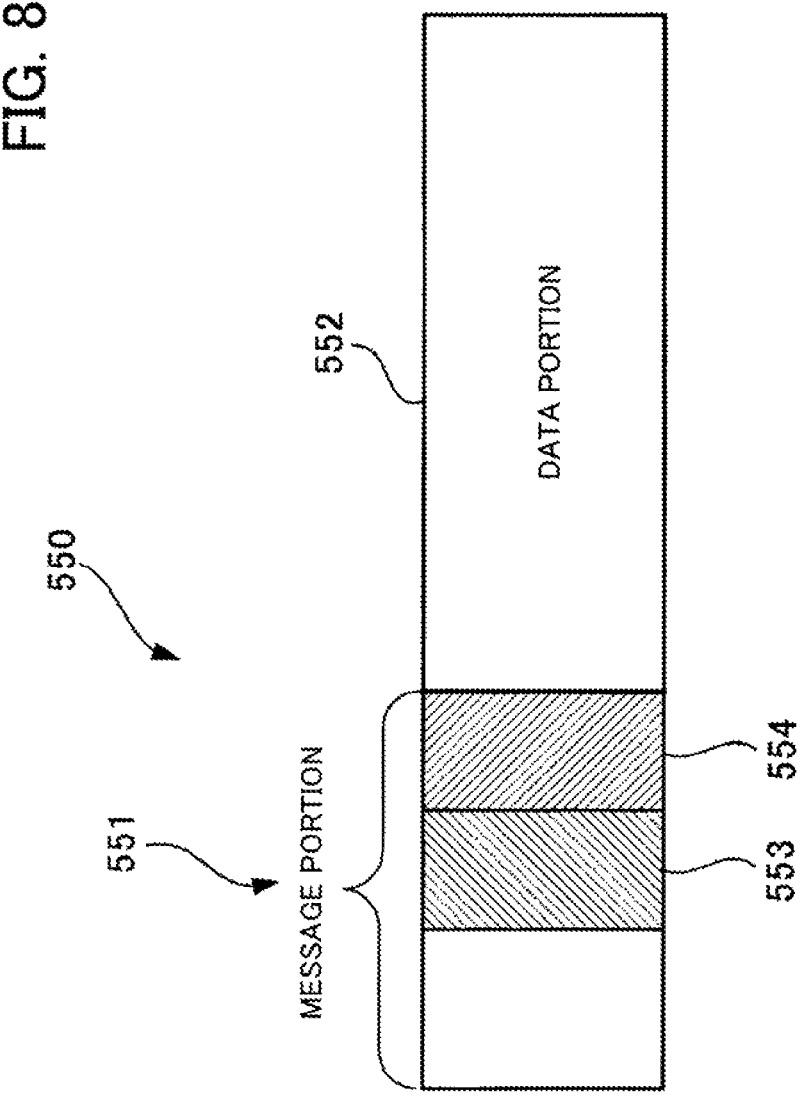
FIG. 8 illustrates a format of transfer data by DMA.

FIG. 8 illustrates a format of the transfer data by DMA.

In the DMA data specifications, transfer data 550 includes a message portion 551 and a data portion 552. The data portion 552 is a portion as an original object to be transferred. On the other hand, the message portion 551 is a portion which is attached to the original portion, and is freely used for notification and the like according to a rule set in advance between a transfer source and a transfer destination. The message portion 551 is eliminated from the transfer data 550 after completion of transfer of the transfer data 550. In the present embodiment, it is assumed that it has been arranged to provide a notification area 553 and a report area 554 within the message portion 551. The above-mentioned notification of the start is incorporated in the notification area 553.

Hereafter, FIGS. 6 and 7 are referred to again.

The checking device 390 performs constant monitoring of the message portion 551 for each of all data items passing between the switch 380 and the main memory 370 using a notification checking section 510. Then, when the notification checking section 510 detects the above-mentioned notification of the start, the checking device 390 records the above-mentioned "start address" and "transmitting device information" in a memory 540 provided therein. Then, the checking device 390 starts checking and accumulation of the size of data passing between the switch 380 and the main memory 370 thereafter using a size checking section 520. The result of the accumulation is also recorded in the memory 540.

The DMA device 350 sends a notification of the completion of data transfer to the checking device 390 as a final step of the data transfer. This notification of the completion is also incorporated in the notification area 553 of the message portion 551 illustrated in FIG. 8, and is then transferred, similarly to the notification of the start.

When the notification checking section 510 detects the notification of the completion, the checking device 390 notifies the DMA device 350 of a combination of the "start address" and the result of integration of the data size which have been recorded in the memory 540, using a result reporting section 530. In the present embodiment, this notification is also sent as a DMA message. That is, the notification of the result report is incorporated in the report area 554 of the message portion 551 illustrated in FIG. 8.

The result of integration of the data size etc. notified to the DMA device 350 as described above are used e.g. for comparison with the original data size, whereby the data delivery is confirmed. More specifically, the original data size is stored in the main memory 370 by the DMA device 350 at the start of transmission of the data, and the original data size and the notified integration result are compared with each other. If the sizes of the both match, it is confirmed that the data has been properly delivered. On the other hand, if the sizes of the both do not match, retransmission of the data is performed. More specifically, when the DMA device 350 transmits the data, a copy of the transfer data is stored in the main memory 370 in association with the "start address". In performing retransmission of the data, the DMA device 350 transmits the transfer data which is associated with the "start address" notified from the checking device 390. That is, in the retransmission of the data, to identify the data to be retransmitted, the above-mentioned start address is used. However, the "start address" attached to the transfer data as the destination has been subjected to address conversion by the switch 380. Therefore, to perform the notification from the checking device 390 to the DMA device 350, inverse conversion of the address is required. In the checking device 390, the result reporting section 530 illustrated in FIG. 6 performs the inverse conversion of the address.

Figure 9:
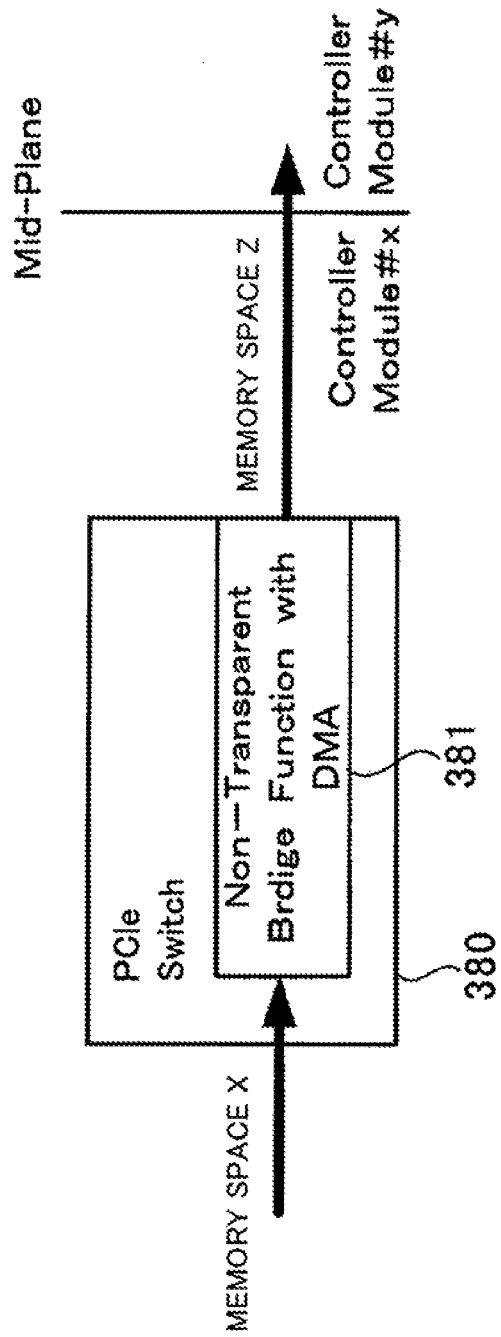
FIG. 9 illustrates a function of address conversion in a PCI Express switch.

FIG. 9 illustrates a function of address conversion by the PCI Express switch.

The PCI Express switch 380 has a non-transparent bridge function 381 integrated therein. The non-transparent bridge function 381 performs address conversion for converting an address space x which can be recognized in the controller module x to an address space z which is used only between the controller module x and the controller module y. To distinguish the plurality of controller modules from one another, an address space wider than those used in the respective controller modules becomes necessary between the controller module x and the controller module y, and hence the address conversion mentioned as above is executed.

Although FIG. 9 illustrates the address conversion function which the switch 380 of the controller module x has, the switch 380 of the controller module y also has the same function. Therefore, in the present embodiment, the "start address" is subjected to address conversion twice before data from the DMA device 350 reaches the checking device 390. In the result reporting section 530 of the checking device 390 illustrated in FIG. 6, a conversion table 391 is prepared which defines the inverse conversion to total conversion as a combination of the two address conversions described above. The address conversions performed by the respective switches 380 of the controller module x and the controller module y have details thereof determined at a time point when the connection relationship between the three controller modules 320_1, 320_2, and 320_3 illustrated in FIG. 3 is set. This is because when the relationship is set as above, the association between the address spaces used in the respective controller modules and the address space used between the controller module x and the controller module y is also set. Further, the details of the conversions remain unchanged unless the settings of the connection relationship are changed. For this reason, in the result reporting section 530 of the checking device 390, the conversion table 391 is prepared at a time point when the contents of the conversions are determined as described above.

FIG. 10 illustrates an example of the conversion table prepared in the checking device.

In the conversion table 391 illustrated in FIG. 10, a reception start address 392, a receiving-side requester ID 393, a monitoring range 394, a transmitting-side controller module number 395, a transmitting-side requester ID 396, and a transmitting-end start address 397 are associated with each other. This table shows that a range of addresses starting from the reception start address 392 and limited by the monitoring range 394 includes a start address obtained from the transfer data by the receiving side, i.e. the checking device-side. Further, the receiving-side requester ID 393 is an ID indicative of a destination device within the controller module of the receiving-side controller module.

The transmitting-side controller module number 395 is a number for identifying a transmitting-side controller module, and the transmitting-side requester ID 396 is an ID indicative of a transmitting-end device within the transmitting-side controller module.

This table also shows that a range of addresses starting from the transmitting-end start address 397 and limited by the monitoring range 394 includes an original start address of the transmitting side which is converted from the receiving-side start address. In the checking device 390, the original start address of the transmitting side can be obtained by the conversion table 391 configured as above. Then, the original start address of the transmitting side is informed to the DMA device 350 by the above-mentioned notification. As a result, the DMA device 350 can easily recognize data sent to which destination the monitoring result is concerned with. More specifically, the DMA device 350 can retrieve a transfer data item for retransmission from transfer data items stored in association with respective start addresses when they were transmitted, using the notified original start address as it is.

Note that if the transmitting side recognizes a conversion rule, the transmitting side can also perform inverse conversion, but since the monitor is responsible for inverse conversion, the entire configuration of the device can be made simpler. Further, although the switch 380 recognizes the conversion rule and performs conversion, the address to be converted by the switch 380 is only an address designated as a true destination in the transfer data. Therefore, if the switch 380 of the transmitting side is caused to convert the above-mentioned notified address, this requires significant modification of the device.

This means that the following application of the present embodiment is favorable. In this application, the above-mentioned transmitter also transmits an address indicative of a destination of data, in a state associated with the data. Further, a converter is provided at any location between the transmitter and immediately before the monitor, for converting the address associated with the transmitted data to another address which is different in the address space according to a predetermined conversion rule. Further, in this application, when notifying the monitoring result to the transmitter, the monitor converts the other address associated with the monitored data back to the original address as the address associated with the data by the transmitter, by inverse conversion to the conversion according to the conversion rule. Then, the monitor also notifies the transmitter of the original address.

The checking device 390 according to the second embodiment also corresponds to an example of the monitor in the above-described application of the present embodiment.

Note that the "address indicative of a destination of data" may be an address indicative of a device, or may be an address indicative of a storage location in a device. Also in the second embodiment, it is possible to use both of an address indicative of a device and an address indicative of a storage location in a device, as a destination of transmission of the data according to the settings of the switch 380.

Now, a description will be given of a third embodiment. The third embodiment is distinguished from the second embodiment only in that the checking device is provided at a different location, and hence the following description will be given mainly of different points.

Figure 11:
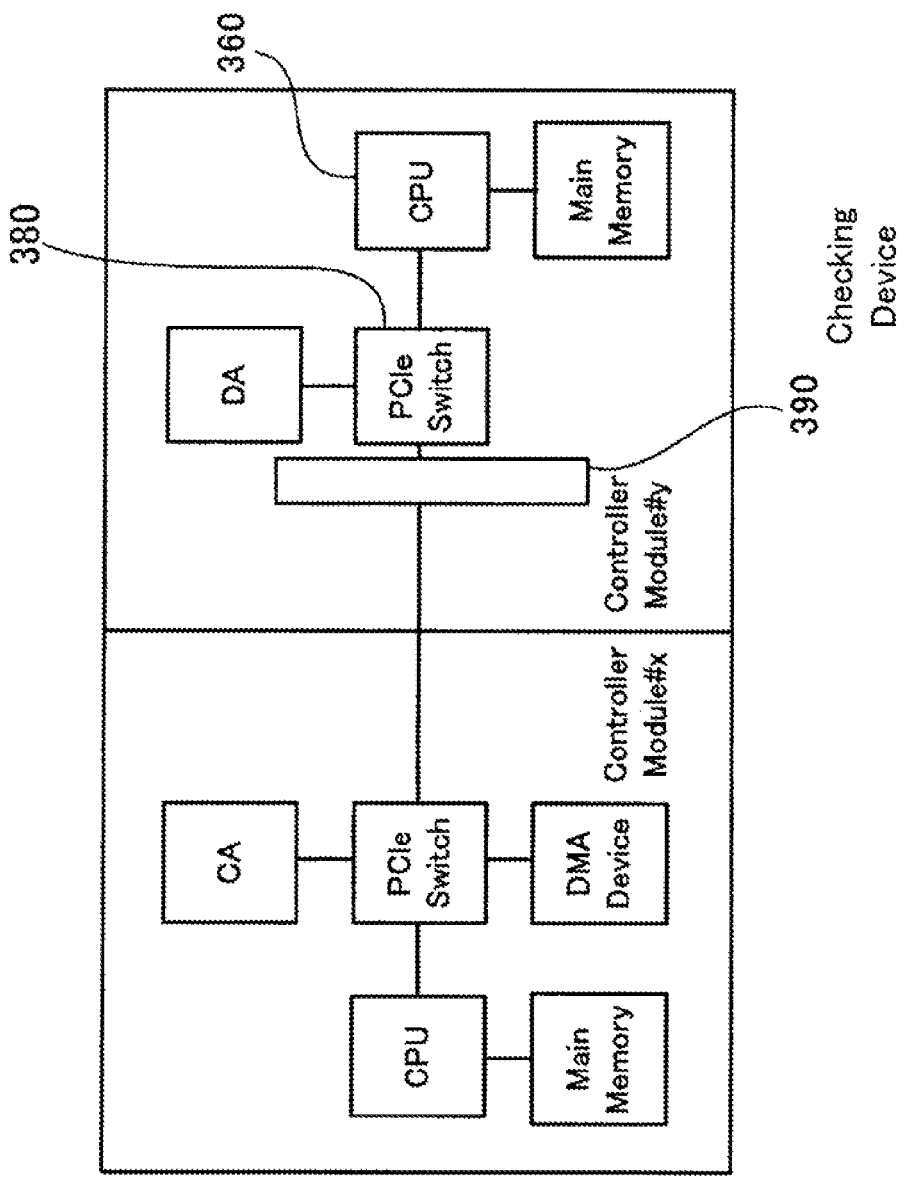
FIG. 11 schematically illustrates controller modules interconnected via DMA devices, in a third embodiment.

FIG. 11 schematically illustrates controller modules interconnected via the DMA devices in the third embodiment.

In the third embodiment, the checking device 390 is located on the opposite side of the PCI Express switch 380 from the CPU 360. The operation for monitoring data performed by the checking device 390 is the same as that in the second embodiment. However, as for conversion of the start address, address conversion is performed such that the address space between the controller module x and the controller module y is converted to the address space within the controller module x. This address conversion is also executed according to the same conversion table as the conversion table 391 illustrated in FIG. 8. The arrangement of the checking device 390 in the third embodiment also corresponds to the arrangement in which the monitor is provided on the communication path from the transmitter to the receiver, similarly to the above-mentioned arrangement in the second embodiment. Therefore, the monitoring operation by the monitor is easier than the monitoring operation performed by arrangements other than this, and it is possible to make the construction and function of the monitor itself simpler.

Note that although it is possible to incorporate the function of the checking device 390 in the switch 380 in theory, this requires significant modification of the device, and hence it is not preferable.

Next, a description will be given of a fourth embodiment. The fourth embodiment is distinguished from the second embodiment only in that the checking device is provided at a different location, and hence the following description will be given mainly of different points.

Figure 12:
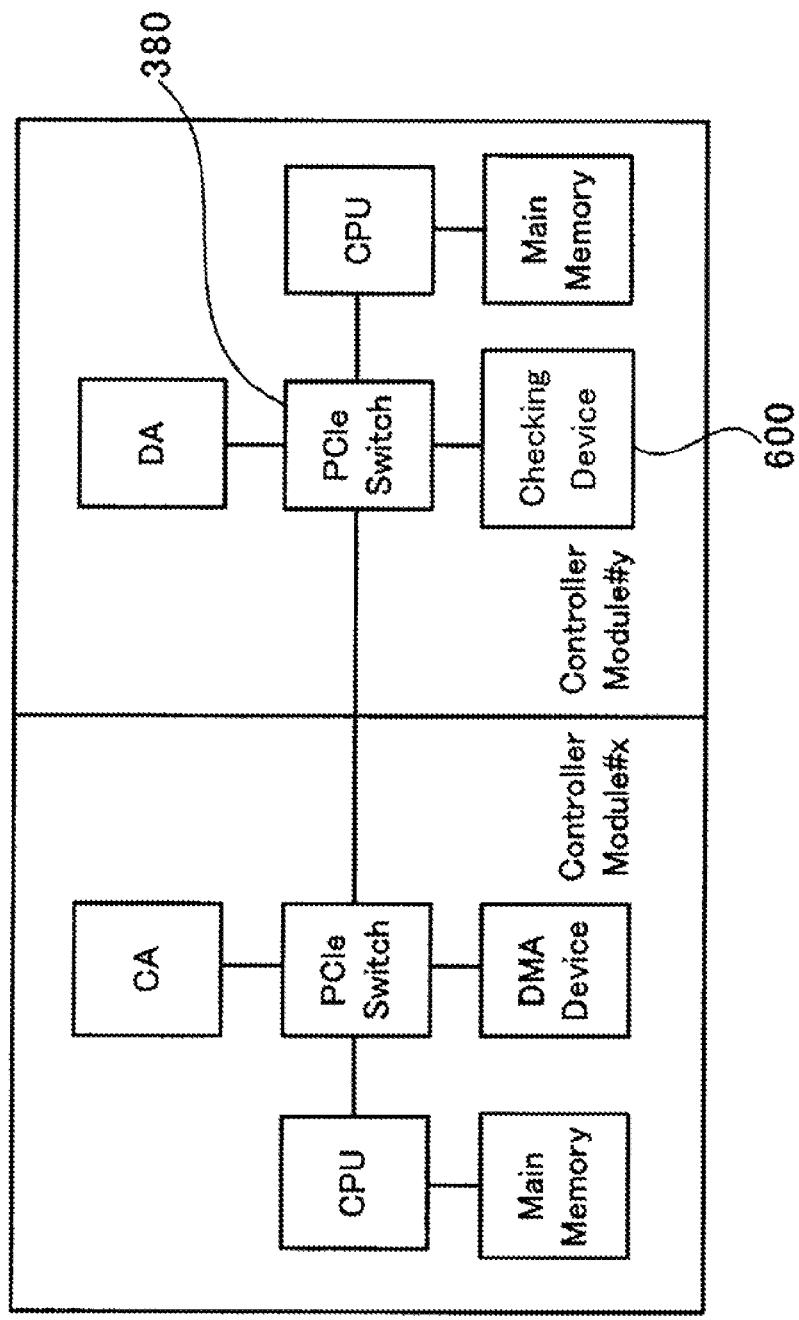
FIG. 12 schematically illustrates controller modules interconnected via DMA devices, in a fourth embodiment.

FIG. 12 schematically illustrates the controller modules interconnected via DMA devices in the fourth embodiment.

In the fourth embodiment, a checking device 600 is provided at a location branched from the communication path for the data transfer at the switch 380. Further, to the checking device 600, an address for recognizing the checking device 600 as a destination of data transmission within the controller module is allocated.

In the fourth embodiment, a multicast function which the switch 380 has is used such that the transfer data can be monitored by the checking device 600.

Figure 13:
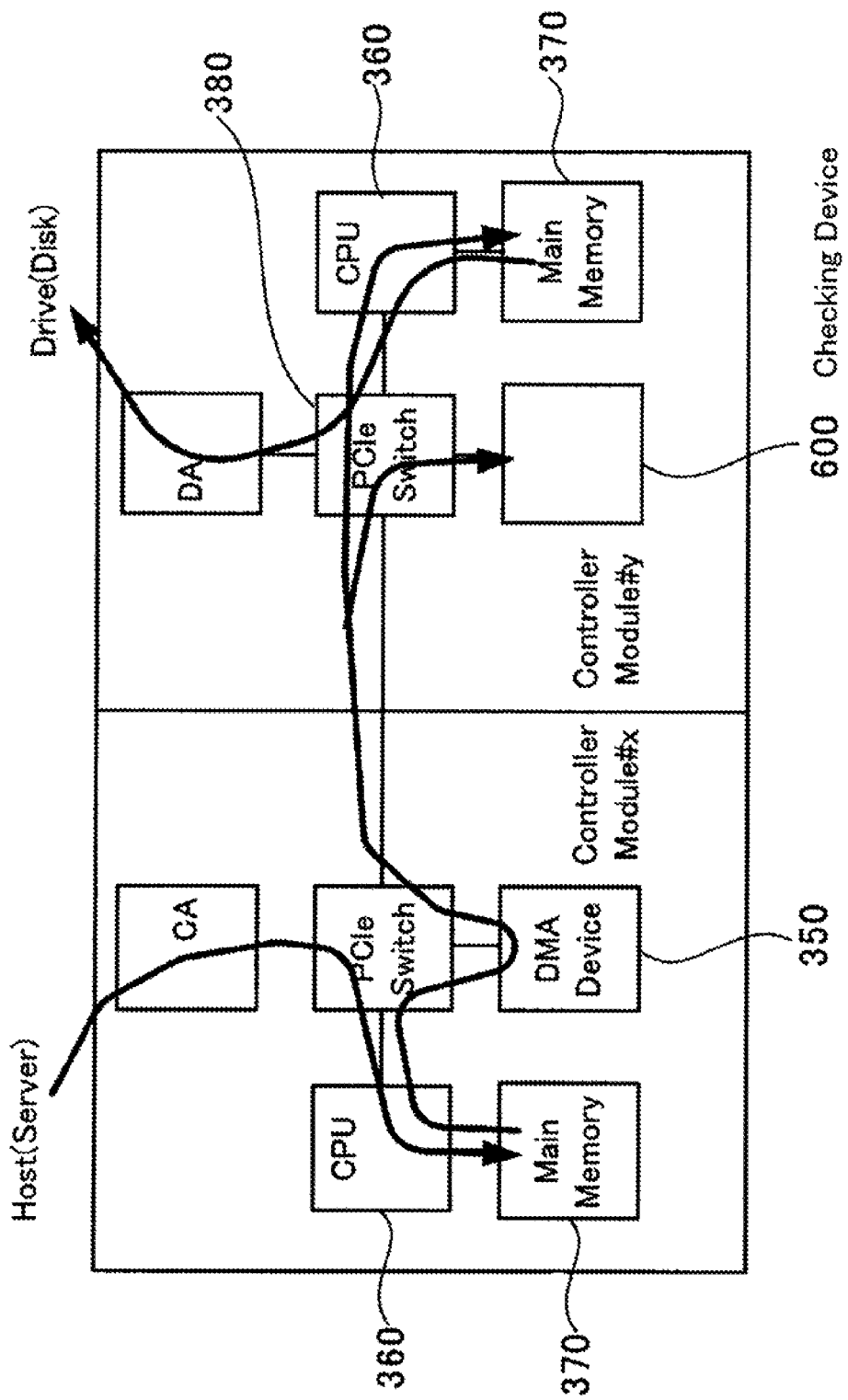
FIG. 13 illustrates an example of data transfer, in the fourth embodiment.

FIG. 13 illustrates an example of data transfer in the fourth embodiment.

In the fourth embodiment, when instructing the DMA device 350 to transfer data to the controller module y, the CPU 360 designates both of the main memory 370 and the checking device 600 of the controller module y as destinations. The DMA device 350 having received this instruction transfers the data using the multicast function. The switch 380 of the controller module y is caused to send the data to both of the main memory 370 and the checking device 600 designated as the destinations.

Figure 14:
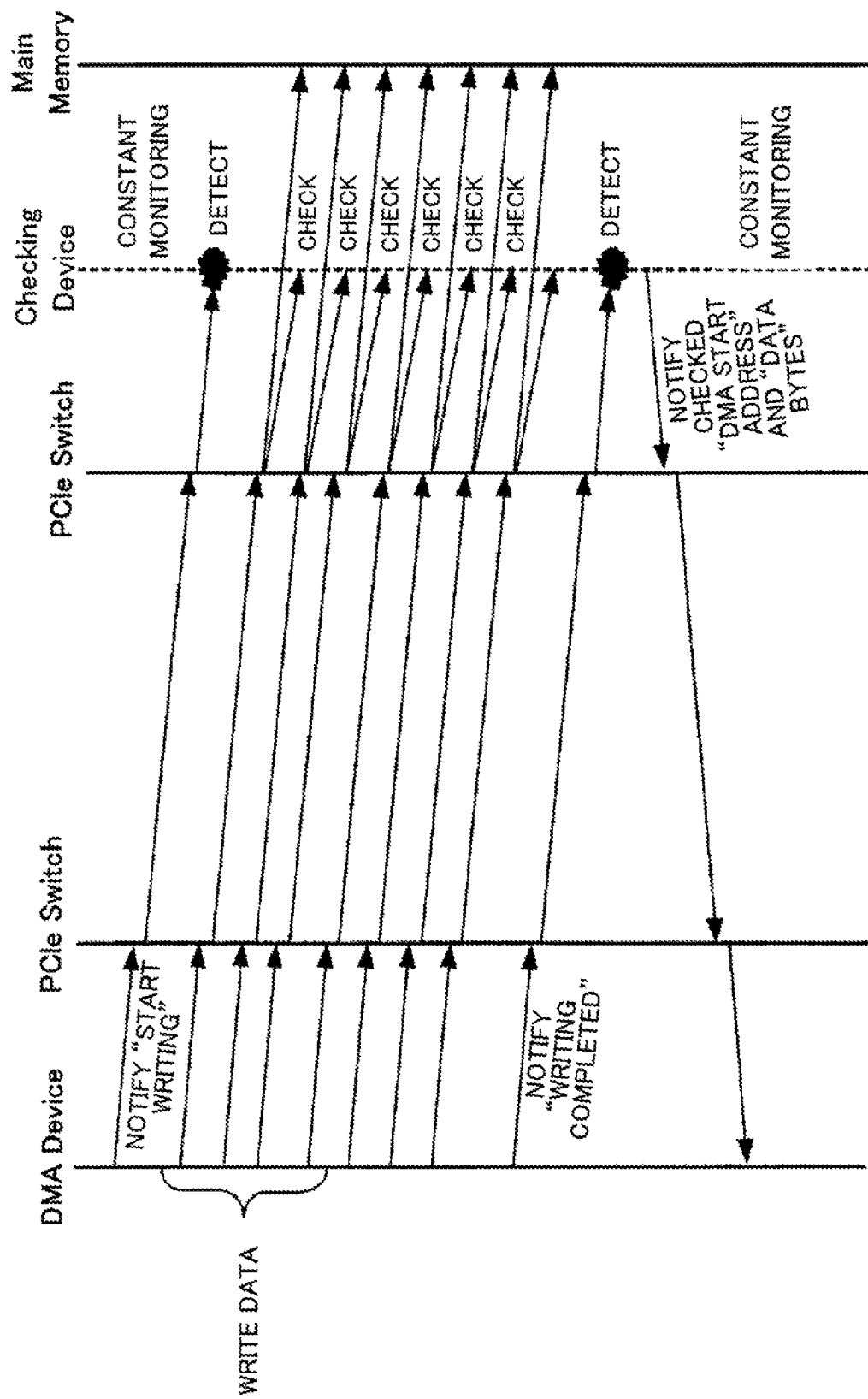
FIG. 14 illustrates details of a monitoring operation in the fourth embodiment.

FIG. 14 illustrates details of the monitoring operation in the fourth embodiment.

As illustrated in FIG. 14, the switch 380 sends the data to both of the main memory 370 and the checking device 600. On the other hand, the above-mentioned notification of the start may be sent using the multicast function and then may be finally eliminated at the main memory 370, but in this example, the notification of the start is sent to the checking device 600 by designating the same as the destination. This enables the main memory 370 to dispense with an operation for eliminating unnecessary data.

As described above, even when data is sent using the multicast function, the checking device 600 executes the same monitoring operation as that in the second embodiment. As a result, it is also possible to confirm the data delivery in the fourth embodiment similarly to the second embodiment.

According to the present disclosure, it is possible to confirm the delivery of data in a device which performs non-handshake communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A data transfer device comprising,
a transmitter configured to transmit data and a first address indicative of a destination of the data by non-handshake communication, while recording a data size of the transmitted data;
a receiver configured to receive the data transmitted from the transmitter;
a converter configured to convert the first address associated with the transmitted data to a second address according to a predetermined conversion rule, the first address and second address belonging to different address spaces; and
a monitor provided separately from the receiver and configured to monitor a size of the data received by the receiver, as well as to convert the second address associated with monitored data back to an original address by inverse conversion that reverses the conversion performed by the converter and notify the transmitter of the original address together with the monitored size of the received data,
wherein the transmitter receives the original address and the monitored size from the monitor and retransmits the data to the receiver by using the received original address when the received monitored size does not match with the recorded data size.

2. The data transfer device according to claim 1, wherein the monitor is provided on a communication path extending from the transmitter to the receiver.

3. The data transfer device according to claim 1, wherein the converter is provided at a location between the transmitter and immediately before the monitor.

4. A storage device, comprising:
a storage configured to store data;
a first processor configured to access the storage;
a second processor configured to receive read commands and write commands from a host device; and
a data transfer device configured to perform internal data transfer between the second processor and the first processor,
wherein the data transfer device comprises:
a transmitter configured to transmit data and a first address indicative of a destination of the data by non-handshake communication, while recording a data size of the transmitted data;

a receiver configured to receive the data transmitted from the transmitter;

a converter configured to convert the first address associated with the transmitted data to a second address according to a predetermined conversion rule, the first address and second address belonging to different address spaces; and a monitor provided separately from the receiver and configured to monitor a size of the data received by the receiver, as well as to convert the second address associated with the received data back to an original address by inverse conversion that reverses the conversion performed by the converter and notify the transmitter of the original address together with the monitored size of the received data, wherein the transmitter receives the original address and the monitored size from the monitor and retransmits the previously transmitted data to the receiver by using the received original address when the received monitored size does not match with the recorded data size.

5. The storage device according to claim 4, wherein the monitor is provided on a communication path extending from the transmitter to the receiver.

6. The storage device according to claim 4, wherein the converter is provided at a location between the transmitter and immediately before the monitor.

* * * * *